June 30, 1936.  H. W. HELMS  2,045,647

HOIST FOR SEMITRAILERS

Original Filed April 8, 1932   2 Sheets-Sheet 2

Witness.
N. F. McKnight.

Inventor.
Harry W. Helms.
by Burton & Burton
his Attorneys.

Patented June 30, 1936

2,045,647

UNITED STATES PATENT OFFICE 2,045,647

HOIST FOR SEMITRAILERS

Harry W. Helms, Detroit, Mich., assignor to Highway Trailer Company, Edgerton, Wis., a corporation of Wisconsin Original application April 8, 1932, Serial No. 603,963. Divided and this application May 31, 1935, Serial No. 24,193

11 Claims. (Cl. 298—22)

This application is a division of my application Serial No. 603,963, filed April 8, 1932, and the purpose of the invention to which it relates is to provide mechanism on the tractor vehicle adapted for tilting the body of a semi-trailer coupled thereto so as to dump the load from the trailer. An object of the invention is to utilize in connection with dumping or lifting mechanism a portion of the connection by which the semi-trailer is attached to the tractor vehicle, but without lifting the heavier portions of the coupling device. The invention consists in the combination herein shown and described, as indicated by the claims.

In the drawings:

Figure 4 is a vertical section on a larger scale than Figure 1, showing the coupling connections of that structure.

Figure 5 is a detail view in side elevation indicating the operation of the coupler during the dumping action.

Figure 2:
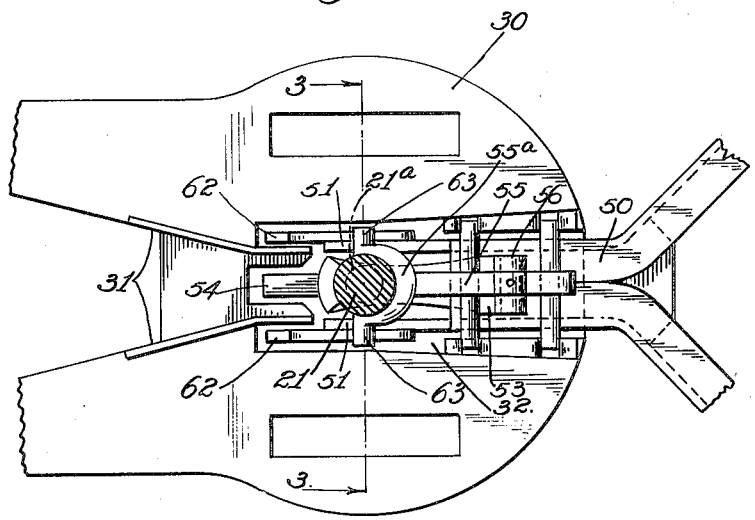
Figure 2 is a plan view of the lower fifth wheel and coupling means employed in the structure of Figure 1.
Figure 3:
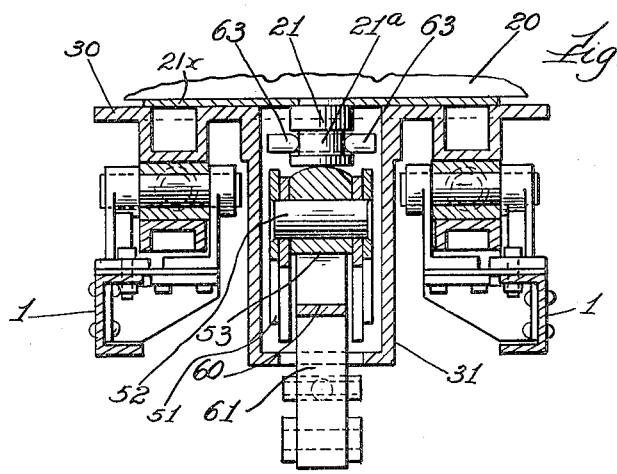
Figure 3 is a vertical section taken as indicated at line 3—3 on Figure 2.

In the structure which is the subject of this invention, the mounting of the hoist or lifting mechanism on the tractor vehicle instead of on the chassis of a trailer permits of a simpler and cheaper construction for the trailer itself, and allows the same hoisting mechanism to serve several trailers used interchangeably with a single tractor. It also permits the owner of a tractor to use it with an assortment of trailers designed for various purposes, among which assortment there may be only one trailer constructed with a dumping body. In my aforesaid application Serial No. 603,963 there is shown an arrangement in which the fifth wheel, by which the tractor and trailer are coupled, is mounted on a hoist mechanism so that the fifth wheel itself is lifted bodily for tilting the trailer body by raising its forward end. In the present construction, however, I avoid lifting the heavier portions of the fifth wheel, namely, the lower element, consisting of the relatively large bearing area, and, instead, this area is made in two sections with a space extending longitudinally between them to accommodate the upward swing of a hoisting arm which engages with the pivot or king pin associated with the upper plate of the fifth wheel and thus lifts the trailer body when the dumping action is desired. The lower element of the fifth wheel is made, as shown in Figure 2, consisting of two platform portions, 30, 30, having a rearwardly opening slot, 31, to receive the king pin for coupling, and having a forwardly opening slot or channel, 32, through which the outer end portions, 50, of the hoisting arms, may move vertically in engagement with the king pin, 21, itself. Hydraulic hoisting cylinders are shown at 17 operatively connected at 19 with lifting arms, 3, fulcrumed at 2 on the frame, 1, of the motor truck.

The supporting tables, 30, of the lower fifth wheel may be formed as integral parts of the same casting, being joined by a deep channel portion, 31, in which the outer ends, 50, of the lifting arms, 3, are accommodated when the parts are in normal traveling position. The ends, 50, of the arms are joined to a terminal, 51, carrying a pivot, 52, which supports a rockable socket member, 53, in which the king pin, 21, of the trailer is lodged in coupled position. The pivot, 52, permits the socket, 53, to change its angular relation to the lifting arms, 3, 3, when the hoist mechanism is operated to elevate the forward end of the trailer chassis, 20, to which the king pin, 21, and upper bearing plate, 21$^x$, are permanently attached, and it also permits the rear end of the socket to be depressed by collision of its inclined cam surface, 54, with the king pin, 21, as the vehicles come together in the coupling operation.

Figure 1:
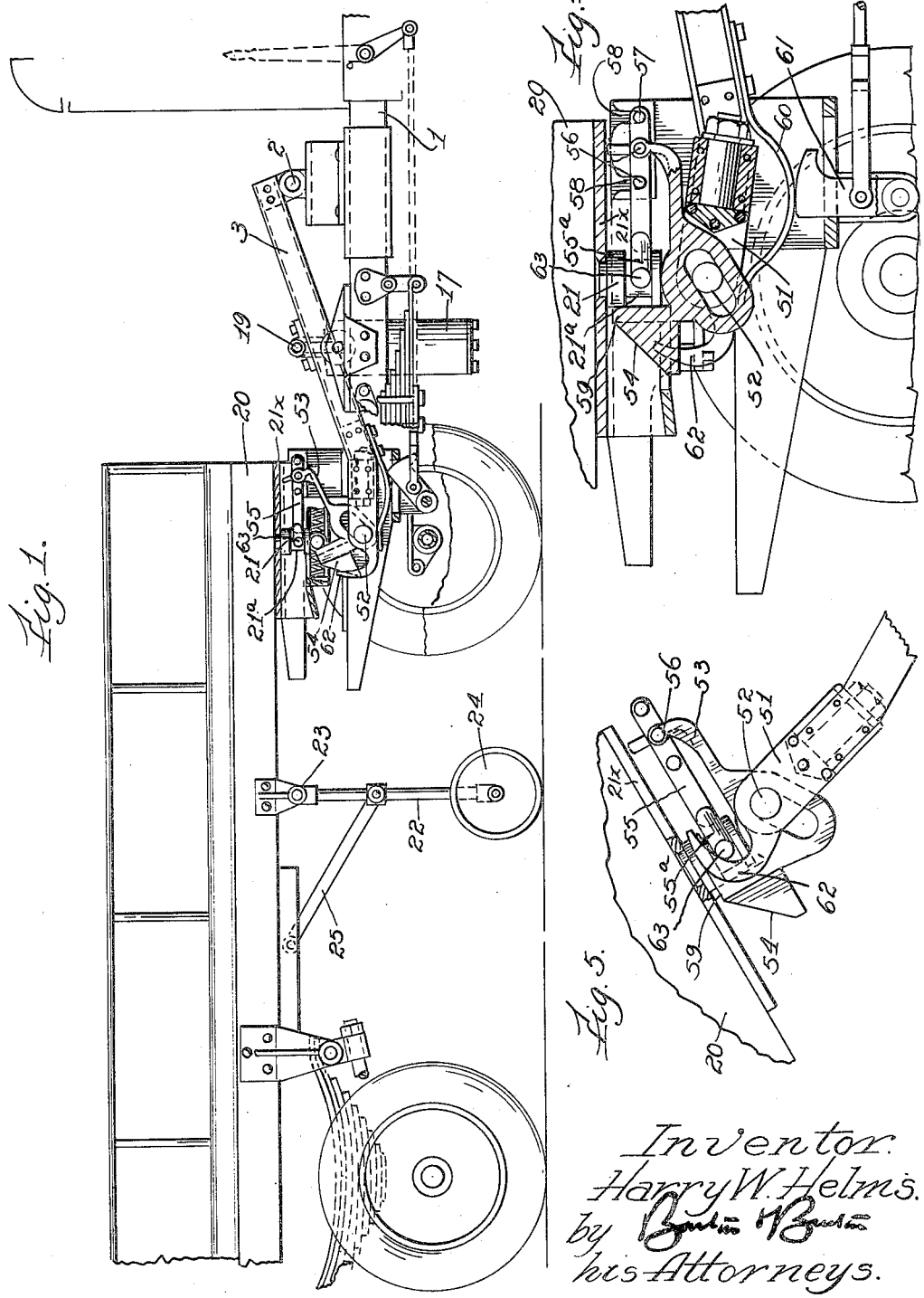
Figure 1 is a partial side elevation of the tractor and semi-trailer embodying the hoisting and coupling mechanism of this invention.

In coupled relation the king pin is retained in the socket by engagement of a forked arm or yoke, 55, which is pivotally attached to the socket member, 53, at 56, so that it may swing vertically through a limited range with respect to the socket, 53. When the hoisting arm, 3, is at its lower limit, the yoke arm, 55, is held in horizontal position by engagement of its laterally extending lugs, 56 and 57, with the bottoms of notches or pockets, 58, in the sides of the channel, 31. The yoke portion, 55$^a$, of the arm, 55, fits into the grooved or reduced portion, 21$^a$, of the king pin and thus serves to check the king pin against upward movement out of the socket when the vehicles are traveling, and at the same time limits forward movement of the king pin, holding it captive against the upstanding rear wall, 59, of the socket member, 53. The terminal, 51, of the hoisting arm, and the socket, 53, which it carries, are yieldingly upheld in coupling position by means of a spring, 60, shown in Figure 4, attached to the under side of the hoisting arm and resting upon a rockable abutment, 61, fulcrumed upon any suitable support associated with the vehicle frame. Thus when the king pin encounters the sloping cam surface, 54, it momentarily depresses the socket, 53, and the end of the hoisting arm, but these parts are returned to their upper limiting position, as shown in Figure 4, by the resiliency of the spring, 60. To permit uncoupling of the vehicles it is only necessary to rock the abutment, 61, into non-supporting position with respect to the spring, 60, as shown in Figure 4, so that the terminal, 51, of the hoisting arm, and the socket, 53, may drop out of engagement with the king pin, 21, permitting the tractor to pull away from the trailer. It will be understood that the temporary support, 22, will have been lowered into operative position, as shown in Figure 1, before the vehicles are thus separated.

As indicated in Figure 5, the socket member, 53, swings about its pivot, 51, when the hoisting arm elevates the trailer chassis, 20, and body to dumping position. To forestall any possibility of the king pin, 21, escaping from the socket while the body is thus tilted up at the forward end, and the pivoted yoke arm, 55, is not checked against swinging about its pivot, 56, I provide a pair of hook-shaped extensions, 62, on the terminal, 51, to engage laterally extending lugs, 63, on the yoke, 55ª. The change of angular relation between the socket, 53, and the terminal, 51, which occurs when the hoisting arm is lowered, carries the hooks, 62, out of engagement with the lugs, 63, as seen in Figure 1.

I claim:

1. In combination, a tractor, a semi-trailer and a separable fifth wheel including a depending coupling member on the trailer and a platform member on the tractor comprising a pair of laterally separated platform surfaces spaced apart to receive the coupling member between them, together with a hoisting arm fulcrumed on the tractor with its lifting end normally disposed between said platform surfaces, and coupling means carried by said end of the hoisting arm engageable with the coupling member of the trailer by relative horizontal movement of said parts with the coupling member accommodated between said platform sections, whereby the hoisting arm is adapted to lift the trailer from the platform surfaces.

2. In the combination defined in claim 1, retaining means associated with said coupling means automatically adjusted when the hoisting member is lifted to elevate the front end of the trailer into dumping position, for preventing vertical separation of the coupling member from the hoisting arm.

3. In the combination defined in claim 1, said coupling member on the trailer being in the form of a depending king pin having a reduced portion, a member carried by the hoisting arm and engageable with said reduced portion of the king pin in the coupled relation of the parts, and supplemental retaining means on the hoisting arm movable to engage a cooperating part of said member when the coupling end of the hoisting arm is elevated for lifting the front end of the trailer and tilting the latter into dumping position.

4. In combination, a tractor, a semi-trailer, a separable fifth wheel including a platform member fixed on the tractor and an upper bearing plate with a depending king pin on the trailer disengageably secured in swiveled relation to the platform, together with hoisting mechanism on the tractor arranged to lift the front end of the trailer for tilting it into dumping position, thereby separating said king pin and bearing plate from the platform, and retaining means arranged to prevent separation of the trailer from the hoisting member and shiftable into effective retaining position by the hoisting movement.

5. In combination, a tractor, a semi-trailer and a separable fifth wheel connecting them, together with a hoisting arm mounted on the tractor for movement through the lower fifth wheel member and provided with means for engagement with the upper member of the fifth wheel in such movement for lifting the trailer from the supporting surface of the lower member and tilting it, said upper member of the fifth wheel including a depending king pin having a reduced portion, means engageable with said reduced portion of the king pin in the coupled relation of the fifth wheel parts, and supplemental retaining means carried by the hoisting arm movable to engage a cooperating part of the upper fifth wheel member incident to the lifting action of the hoisting arm in tilting the trailer.

6. In combination, a tractor, a semi-trailer and a separable fifth wheel including a depending coupling member on the trailer, and a platform member on the tractor comprising a pair of laterally separated platform surfaces spaced apart to receive the coupling member between them, together with a hoisting arm fulcrumed on the tractor ahead of said fifth wheel with its movable end disposed to pass between said platform surfaces, whereby said arm is adapted to engage said depending coupling member and lift the trailer.

7. In the combination defined in claim 6, retaining means associated with said hoisting arm and automatically adjusted by the lifting movement of said arm for preventing vertical separation of said coupling member from the hoisting arm.

8. In the combination defined in claim 6, a socket carried at the end of said hoisting arm to engage the depending coupling member, with universal pivotal connections between the socket and the arm to accommodate the change in angular relation between the hoisting arm and the trailer in the lifting operation.

9. In the combination defined in claim 6, a socket secured to the end of the hoisting arm for engaging said depending coupling member, the rear end of said socket having an inclined cam surface, and the socket being yieldingly depressible with respect to the arm to permit said coupling member to ride over said cam surface in the coupling operation.

10. In the combination defined in claim 6, a socket secured to the end of the hoisting arm for engaging said depending coupling member, the rear end of said socket having an inclined cam surface, and the socket being yieldingly depressible with respect to the arm to permit said coupling member to ride over said cam surface in the coupling operation, together with means for lowering said socket at will to release the coupling member.

11. In combination, a tractor, a semi-trailer, a separable fifth wheel including a platform member fixed on the tractor, and an upper bearing plate with a depending king pin on the trailer disengageably secured in swivelled relation to the platform, together with hoisting mechanism on the tractor arranged to lift the front end of the trailer for tilting it into dumping position, thereby separating said king pin and bearing plate from the platform, and retaining means actuated by the hoisting member and shifted thereby into position to prevent separation of the trailer from the hoisting member when the trailer is tilted.

HARRY W. HELMS.